(12) United States Patent
Leininger et al.

(10) Patent No.: US 9,177,320 B2
(45) Date of Patent: Nov. 3, 2015

(54) SYSTEM AND METHOD FOR INTELLIGENT INFORMATION GATHERING AND ANALYSIS

(75) Inventors: Kevin E. Leininger, Wrightstown, PA (US); Joshua I. Halpern, Princeton Junction, NJ (US); Michael A. Lewis, Stroudsburg, PA (US)

(73) Assignee: Internet Crimes Group, Inc., Princeton, NJ (US)

( * ) Notice: Subject to any disclaimer, the term of this patent is extended or adjusted under 35 U.S.C. 154(b) by 680 days.

(21) Appl. No.: 11/295,103

(22) Filed: Dec. 5, 2005

(65) Prior Publication Data

US 2006/0224409 A1    Oct. 5, 2006

Related U.S. Application Data

(60) Provisional application No. 60/632,854, filed on Dec. 3, 2004.

(51) Int. Cl.
| | |
|---|---|
| G06F 17/30 | (2006.01) |
| G06F 17/00 | (2006.01) |
| G06Q 30/02 | (2012.01) |
| G06Q 10/06 | (2012.01) |
| G06Q 50/26 | (2012.01) |

(52) U.S. Cl.
CPC .......... *G06Q 30/02* (2013.01); *G06Q 10/0637* (2013.01); *G06Q 50/26* (2013.01)

(58) Field of Classification Search
CPC ....... G06Q 30/02; G06Q 10/06; G06Q 10/10; G06Q 30/06; G06Q 10/00; G06Q 30/0256; G06Q 30/0257; G06Q 30/0269; G06Q 30/0601; G06Q 30/0623; G06Q 50/184; G06Q 50/22; G06Q 10/06395; G06Q 10/107; G06Q 20/3827; G06Q 20/389
USPC .................................. 707/706, 723, 737, 722
See application file for complete search history.

(56) References Cited

U.S. PATENT DOCUMENTS

| | | | | |
|---|---|---|---|---|
| 5,893,092 | A * | 4/1999 | Driscoll | 707/5 |
| 6,216,128 | B1 | 4/2001 | DiCrescenzo | |
| 7,124,129 | B2 * | 10/2006 | Bowman et al. | 707/5 |
| 7,912,842 | B1 * | 3/2011 | Bayliss | 707/749 |
| 2002/0161664 | A1 * | 10/2002 | Shaya et al. | 705/26 |

* cited by examiner

*Primary Examiner* — Yicun Wu
(74) *Attorney, Agent, or Firm* — Moritt Hock & Hamroff LLP; Steven S. Rubin, Esq.

(57) ABSTRACT

A system and method for intelligent information gathering and analysis. Information is gathered from a plurality of open sources such as markets, investigations, government databases, internet intelligence, and public records. The gathered information is parsed and linked based on marketplace activities including threats. The parsed and linked information is sent to a database where queries can be applied to produce dossiers on entities. A client may add his own information to enrich a dossier and reports may be made based on the dossiers. Alerts may be generated when certain predefined conditions are met. These alerts can be used to drive various actions.

20 Claims, 7 Drawing Sheets

Company — 100

Created: X/X/X   Updated: X/X/X   118→   | Edit | Link It! | History | Data |

Primary Class 102      City, Region, Country 106
Industry 1, Industry 2,        Address Type           Revenue: $5,000,000 (self-reported, unaudited)
Industry 3, Industry 4, ...    # Other Addresses      Employees: 50 (self-reported, unaudited)
                 110                                 108
                         104

Related Intelligence Items

Click on a Field Below to    Click on an Item Below to    Click on a Relationship to View
Display All Related Items    Display Facility Details     Source Files and Related Briefs
112

| Individuals | # |
|---|---|
| Companies | # |
| Addresses | # |
| ????? | # |
| ????? | # |
| Phone Fax Mobile | # |
| Profiles | # |
| Licenses | # |
| Assets | # |
| Facilities | # |
| Aliases | # |
| Domains | # |
| Email | # |
| IP Addresses | # |

| Facility | Address | City | Co. | Relationship | Str. | Date |
|---|---|---|---|---|---|---|
| Head Quarters | Springfield | NJ | US | License, SOS, ... | 2 | x/x/x |
| Warehouse | Jericho | NY | US | WHOIS, web site, ... | 2 | x/x/x |
| Office | Winnipeg | Manitoba | CA | HUMINT | 2 | x/x/x |
| Office | Vancouver | British Columbia | CA | web site | 2 | x/x/x |
| Warehouse | Munich | Bavaria | GE | Article | 2 | x/x/x |

<<  < Displaying Records 1 - 5 of 35 >  >>
>> Click Here to Display All Items in New Window

114

116

| Analyst Brief | Brief Type | Characters | Date | Cost | |
|---|---|---|---|---|---|
| A. Person | HUMINT | 5 | x/x/x | $ | Purchase Brief |
| B. Person | Open Source Investigation | 2 | x/x/x | $ | Purchase Brief |
| A. Person | Business Analysis | 5 | x/x/x | $ | Purchase Brief |

Click on Brief Name for Synopsis         <<  < Displaying Records 1 - 3 of 6 >  >>

SYSTEM AND METHOD FOR INTELLIGENT INFORMATION GATHERING AND ANALYSIS

RELATED APPLICATIONS

This application claims priority to provisional application 60/632,854 filed Dec. 3, 2004, entitled "Method and System for Evidence and Intelligence Acquisition and Analysis", the entirety of which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The invention relates to information collection and analysis and, more particularly, relates to the collection of data from a plurality of distinct sources and linking that information in light of marketplace activity to acquire richer and more detailed information about an entity.

2. Description of the Related Art

Threats to the marketplace are continuously evolving, becoming more complex and more prevalent. Some statistics show that 7-9% of global trade, and 10% of the sales on the Internet, relate to counterfeit goods. Counterfeiting is a multi-dimensional problem. If the goods being sold are drugs, for example, an ingested counterfeit drug may result in serious health consequences. If the drug is diverted and sold through a different distribution channel than originally intended, the drug may end up in a different country, be sold for below or above market price, be sold in a country without conforming to necessary regulations, and the company manufacturing the drug may lose significant profits and/or be charged with misleading the public in its sales. It is desirable to acquire as much information about the sale of products and services so as to limit these exposures.

In recent years, Internet retailers of counterfeit and diverted goods have increasingly leveraged the Internet to directly market infringing products to global consumers. Internet retailers are combining websites, advertising portals, affiliate programs, banner advertisements, search engine placements, and unsolicited bulk email to reach a far broader and wealthier consumer demographic than was historically accessible to black and gray markets.

The act of acquiring intelligence and evidence on particular activities is necessary in many endeavors. In the legal arena, acquiring solid, highly reliable evidence is crucial in advancing a party's theory in a case. If the evidence acquired does not have a certain minimum level of veracity, it may not even be admissible in courts of law. For businesses, acquiring intelligence about competitors is beneficial in determining marketing strategies. Businesses may even desire to learn more information about how their own businesses are operating. Complex businesses using many different supply chains and/or distribution channels, may desire to learn more about the entities in channels they are using to ensure that products are not given to distributors who have a history of diverting or counterfeiting goods.

Some prior art intelligence and evidence acquisition methods gather information about an entity from open sources such as government records or court filings. Those records include basic information about an entity such as an address, company name, etc. If two entities share some of the same information (e.g. they share the same address) some prior art methods are capable of even linking these two entities and indicating that they are related in some manner. Other prior art systems receive limited data about an entity from a client but do not supplement such data with information available to the public from open sources. For example, in response to a query relating to Product X, these prior art systems may indicate that there are 10,000 sellers of product X but will not link that information with openly available sources of information.

Such prior art systems are also generally static in that they typically represent a snapshot in time of information gathered about an entity from limited sources. These systems do not evolve to provide an updated view of an entity as more information is acquired about the entity. Further, there is no means in the prior art systems for intelligent linking of acquired information.

Thus, there is a need in the art for a system and method for acquiring more complete information about an entity, and intelligently linking that information.

SUMMARY OF THE INVENTION

One embodiment of the invention is a system for acquiring information about an entity. The system comprises a server effective to gather first information about an entity from open sources and a processor connected to the server, the processor effective to generate a dossier on the entity based on the first information from the open sources. The system further comprises a receiver connected to the server and processor, the receiver effective to receive second information about the entity from a client; wherein the processor is effective to modify the dossier based on the second information from the client to produce a modified dossier.

Another embodiment of the invention is a system for acquiring information about an entity. The system comprises a server effective to gather information about an entity; and a processor connected to the server, the processor effective to process the information and determine marketplace activity of the entity; wherein the server is effective to receive additional information about the entity; and the processor is effective to modify the dossier based on the additional information and the marketplace activity to produce a modified dossier.

Still another embodiment of the invention is a product produced by the process of: gathering pieces of information about an entity; linking the pieces of information based on a marketplace activity of the entity to produce linked information; and generating an electronic product on the entity based on the linked information.

Yet another embodiment of the invention is a method for processing information about an entity, the method comprising gathering a plurality of pieces of information about an entity; parsing the plurality of pieces of information to produce parsed information; and linking at least some of the plurality of pieces of information based on marketplace activity of the entity.

Still yet another embodiment of the invention is a display comprising: a representation of a client and a representation of a customer. The display further comprises a representation of a distribution channel used in moving a product from the client to the customer, the representation of the distribution channel including a link to at least one dossier on at least one

DETAILED DESCRIPTION OF THE PREFERRED EMBODIMENT(S)

Figure 1:
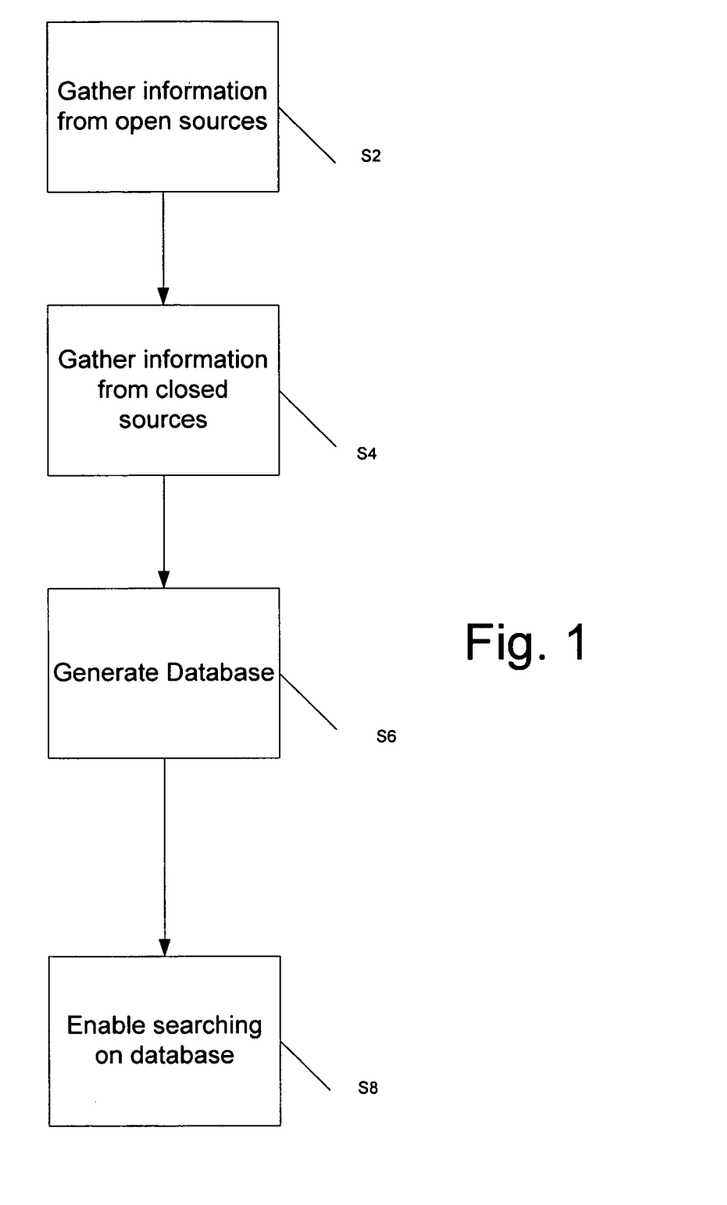
FIG. 1 is a flow diagram illustrating a process for gathering information and enabling searching on the information in accordance with an embodiment of the invention.

Referring to FIG. 1, there is shown a process for acquiring information about an entity in accordance with an embodiment of the invention. An entity may include a person, a business, an endeavor (such as counterfeiting, drug trafficking, diverting etc.), a product, or a service, for which it is desired that information be acquired. At step S2, the process gathers information from open sources. Open sources of information include, for example, information that is available to the public such as through the Internet, license records, business directories, advertisements, corporate records, and corporate filings. As discussed in more detail below, even though the information is available to the public, the collection of particular types of open source information has not heretofore been gathered together in the prior art. At step S4, the process gathers information from closed sources. Such closed sources could include, for example, information that is not available to the public—such as information gathered or only available from a particular client, confidential information, information gathered off of computers seized pursuant to a court order, investigative reports from a client or third party, product analysis from a client or third party, business analysis from a client or third party, etc. At step S6, a database is generated including the information acquired from the open and closed sources. Prior art systems did not have the ability to combine such closed source information with open source information. At step S8, the process enables searching to be performed on the information in the database. A more detailed explanation of each of the steps is set forth below.

Figure 2:
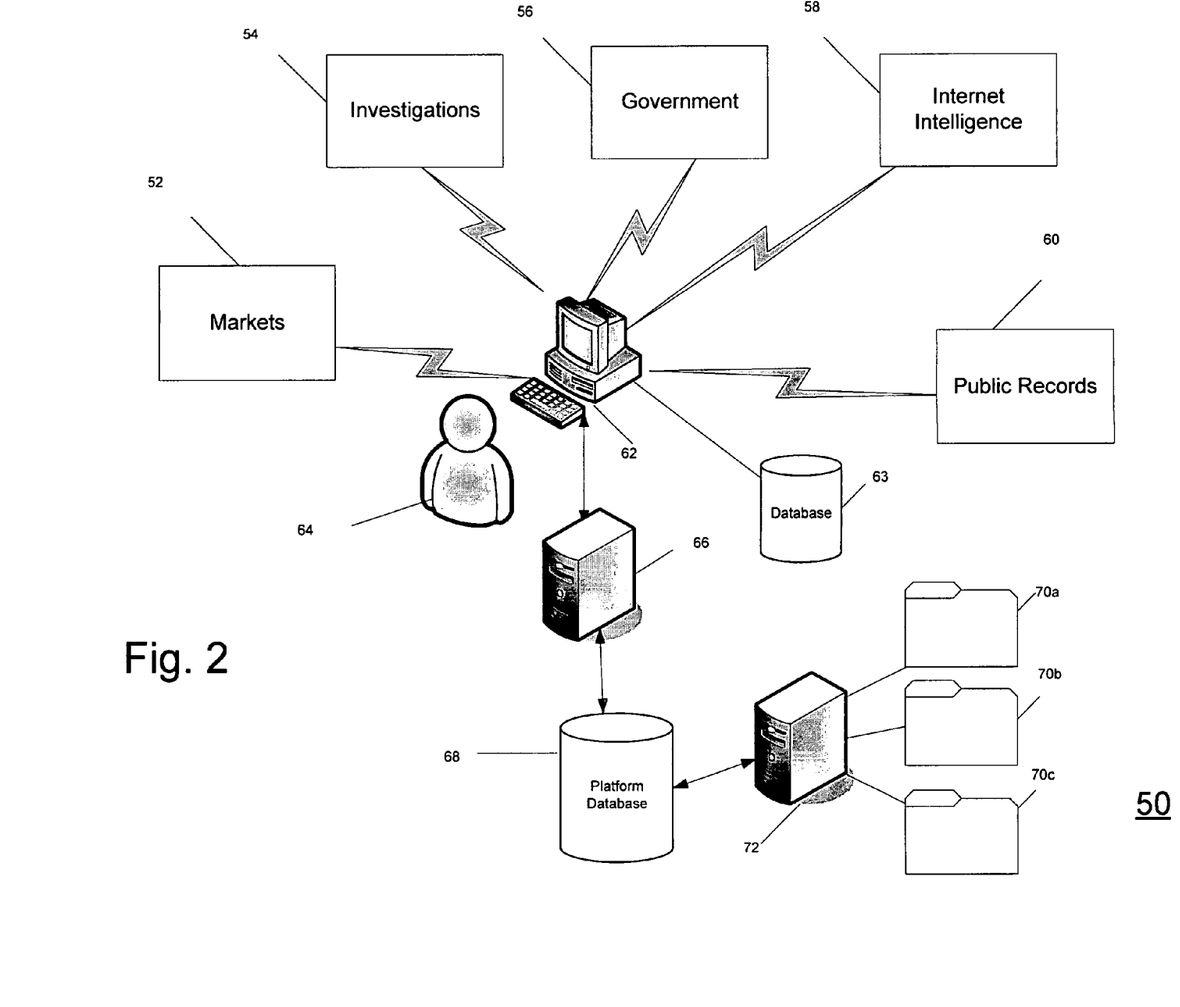
FIG. 2 is a system diagram illustrating a system for gathering information and enabling searching on the information in accordance with an embodiment of the invention.

Referring to FIG. 2, there is shown a system 50 in accordance with an embodiment of the invention. System 50 could be used to implement, for example, the process shown in FIG. 1. System 50 includes an analyst terminal 62 which could be accessed by an analyst 64. As shown in the figure, analyst 64 and terminal 62 may have access to many different sources of open source information such as markets 52, investigations 54, government data 56, internet intelligence 58 and public records 60. Markets 52 may include, for example, information about distributors, retailers, importers/exporters, re-labelers, re-exchangers, catalogues, and financials for a desired market. Investigations 54 may include, for example, information such as investigation files from sources such as EDDI, Inc., law firm files, clients, private investigators, or other human intelligence acquired by analyst 64. Government data 56 may include, for example, import and export databases such as OASIS/FIARS, parallel traders, FDA and pharmacy licensing databases. Internet Intelligence 58 may include, for example, trade forums, trade bulletin boards, internet storefronts, auctions, WHOIS databases, file text protocol information, Internet Service Provider databases, IRC (Internet relay chat) logs, HREF images, unsolicited email trap accounts, SMS (short message service) trap accounts, voice over IP (VoIP) trap accounts, Usenet groups, and chat room logs. Email trap accounts may be used to collect unsolicited email as described in, for example, copending application entitled "Information Security Threat Identification Analysis and Management", Ser. No. 10/954,806 filed Jan. 9, 2004, the entirety of which is hereby incorporated by reference. For example, trade boards may be spidered looking for desired information—for example information about sales of product ABC. Public records 60 could include, for example, business filings, court dockets, government inquiries, and media.

For each of these sources, a snapshot of the original acquired data may be maintained in an evidence database 63 before being sent to a linking and parsing server 66 (discussed below). In this way, reliable evidence may be stored and later used if needed. In addition to the open sources mentioned above, a client using system 50 may request that certain sources of information be accessed. For example, the client may desire that a certain trade board be analyzed or spidered for product ABC. Analyst 64 may be used to review trade board sites that are not amenable to algorithmic spiders.

For example, if a customer utilizing system 50 desired to know more information about drug XYZ, analyst 64 would consult open sources 52, 54, 56, 58 and 60 to acquire intelligence regarding drug XYZ. Entities who distribute, sell, import, or export drug XYZ or list drug XYZ in catalogues or their financials will be identified through market sources 52. Ongoing investigations such as private investigations or EDDI files relating to entities dealing with drug XYZ are identified from investigations sources 54. Government information about drug XYZ including pharmacy licensing is acquired from government sources 56. Trade forums, chat rooms, WHOIS databases etc. are consulted for drug XYZ as the internet intelligence sources 58. Public records 60 are also queried regarding drug XYZ.

All of the open source information gathered by analyst 64 is then fed to a parsing and linking server 66. A link may be created between evidence stored in evidence database 63 and the evidence parsed by parsing server 66. Parsing and linking server 66, along with analyst 64, parses the gathered information so that it may all be fed into a single platform database 68. Parsing and linking server 66 combines unstructured information, such as web pages and emails, with structured information, such as phone numbers, names, addresses, etc. into an organized database. Although only a single parsing and linking server 66 is shown, as large volumes of unstructured information may be received, a plurality of parsing and linking servers may be employed and implemented in a parallel. A centralized parsing and linking server may be used as a hub to coordinate parsing and linking activities and act as a central point for the distribution of raw intelligence to multiple disparate spoke parsing and linking servers. The spoke parsing and linking servers may operate independent of one another. Such an arrangement may provide increased scalability.

For example, if an electronic document is acquired by terminal 62, parsing and linking server 66 may crawl through the document searching for phone numbers, email addresses, domain names, URLs in a message body, root domains of URLS in the message body, root domains in the message header, DNS host names and root names, record creation date, record last updated date, registrant name, registrant address, registrant email, registrant phone number, types of registrants, etc. Trace routes, where a request from server A ends up going to a server B, may be tracked by analyst 64 and the information fed to server 66 so that any intermediate internet protocol addresses and domains may be tracked and captured. For trade boards, information such as the date of an offer, an identification of the trade board, a URL of the offer, a type of listing, the text of the offer, the company listed in the offer, the company location listed, any websites listed in the offer, email addresses, persons listed in the offer page, mail addresses, and phone numbers may all be parsed by parsing server 66.

Parsing and linking server 66 and analyst 64 also link pieces of the received information together based on relationships among the received information so that more intelligent analysis of the gathered information is available. For example if information is acquired about a particular web address, parsing and linking server 66, in combination with analyst 64, may access a WHOIS lookup and find out more information about the address. If an email trap account receives an unsolicited email regarding a drug XYZ, analyst 64 and parsing and linking server 66 may look for domains relating to the email. Thereafter, a search may be performed for other domains run by the same individual, where those domains are registered, etc. All of this information is linked together and stored in database 68.

Unlike the prior art, the linking performed by parsing and linking server 66 in conjunction with analyst 64 may be done with a focus on marketplace activity including a threat by a malefactor. Examples of marketplace activity or threats by malefactors include counterfeiting, domain name hijacking, fraud, product diversion, hacking, phishing, virus-spreading, identity theft, digital piracy, sending unsolicited email, product hoarding, distribution contract violations, channel fraud, etc. Prior art techniques simply gathered together limited information from sources and linked the information without any particular focus except perhaps to gather information about an individual or business. Linking in system 50 is more intelligent. For example, by comparing received information relating to offers for sale against a taxonomy of countries and geographic regions, and linking that information with parsed words like "buy", "sell" and "offer", system 50 can classify perceived marketplace activities. As a consequence, system 50 may determine, for example, whom an entity sells products to, ships products to, etc. In this way, an entity may be associated with marketplace activities which a potential to threaten a manufacturer's value chain.

Some examples of relationships among received data include a shared advertising channel—such as a mail house or advertising portal that works for multiple retailers; a shared product supplier and distributor—the party that physically obtains and ships products ordered via a given retail website; and a shared hosting company.

Once the open source data is parsed, linked and stored in platform database 68, a query server 72 may be used to issue queries on platform database 68 for particular entities. It should be noted that information stored in database 68 may be continuously analyzed and linked together. As a large amount of information may be gathered on each entity, query server 72 can package this information from platform database 68 and produce a file or dossier 70 for a particular entity. Three dossiers 70a, 70b and 70c are shown in FIG. 2. Dossiers 70 may be grouped together into logical containers such as cabinets. Dossiers 70 are discussed in more detail below.

Figure 3:
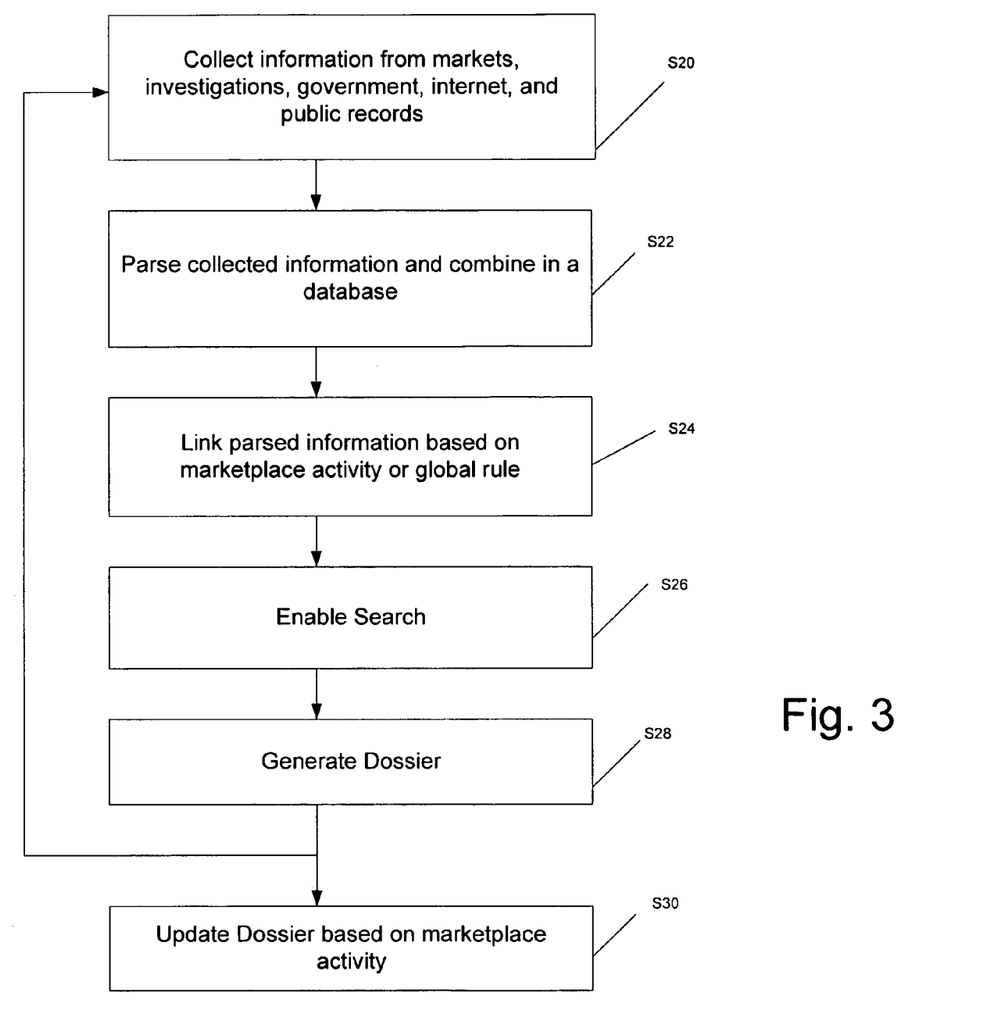
FIG. 3 is a flow diagram illustrating a process for gathering information and enabling searching on the information in accordance with an embodiment of the invention.

Referring to FIG. 3, there is shown a flow chart illustrating acquisition and analysis of information in accordance with an embodiment of the invention. The process of FIG. 3 could be implemented using, for example, the system shown in FIG. 2. As shown in FIG. 3, at step S20, information is collected from various open sources including markets, investigations, government records, Internet intelligence, and public records. At step S22, the information gathered in step S20 is parsed and combined in a database. Based on the parsing, either an analyst or parsing server 66 may define a global rule. The global rule may be a Boolean condition or series of conditions based on parsed information and may be stored in, for example, parsing and linking server 66. This global rule may then used in monitoring incoming data for matches and may be used to automatically generate notifications or modify relevant dossiers (as is discussed in more detail below).

At step S24, pieces of the gathered information, either before or after being stored in database 68, are linked based on marketplace activity. At step S26, searching is enabled on the database. At step S28, a dossier is produced based on the search. Steps S20-S28 may be repeatedly performed and at step S30, the dossier may be updated based on marketplace activity.

Figure 4:
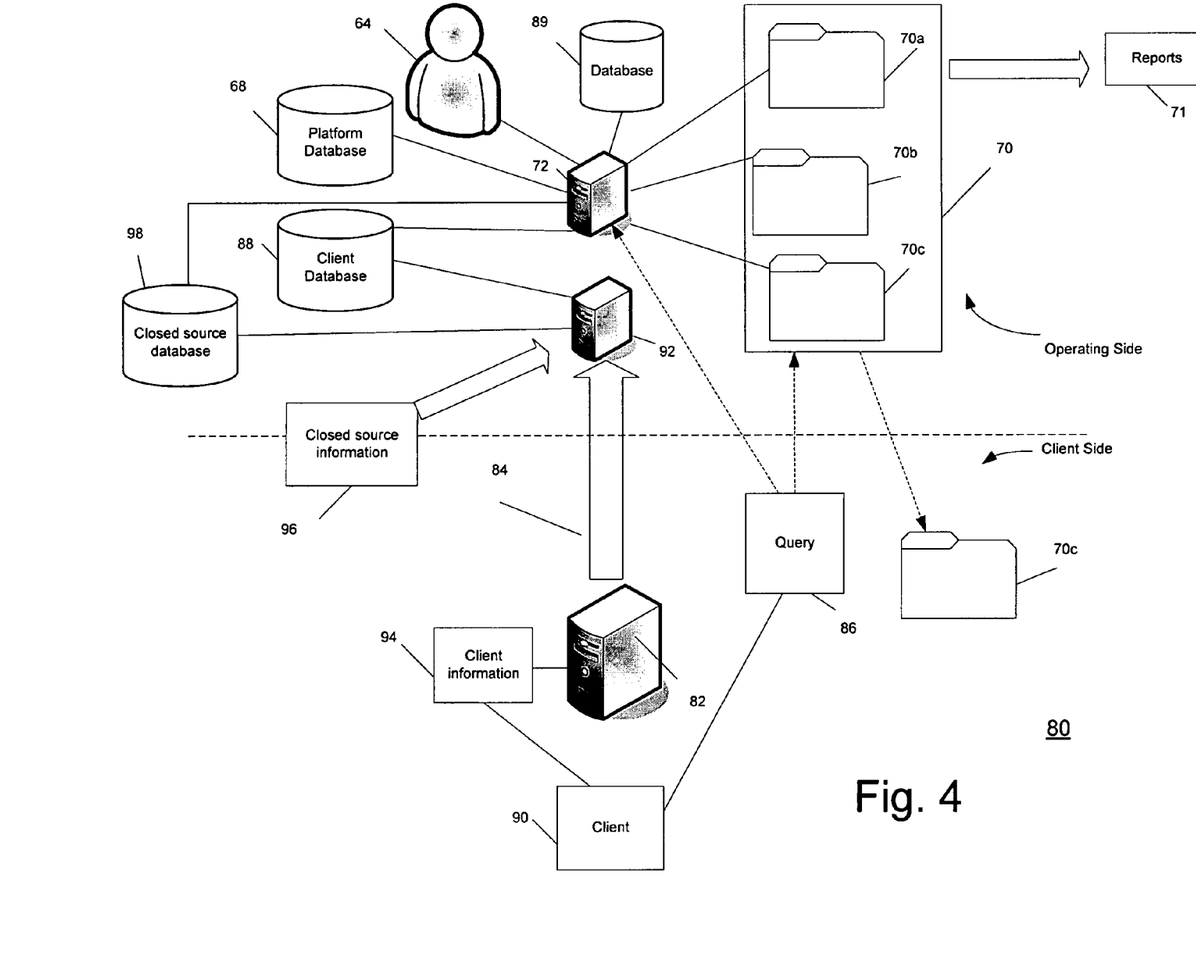
FIG. 4 is a system diagram illustrating a system for gathering information and enabling searching on the information in accordance with an embodiment of the invention.

Referring to FIG. 4, there is shown a system 80 in accordance with an embodiment of the invention. As shown in the figure, system 80 may include an operation side including platform database 68, discussed earlier, or any other database of information 89. Also shown is query server 72 and dossiers 70. In addition to information gathered from open sources, system 80 further includes a client side including a client server 82 which provides closed source information from a client 90. Client 90 is a client of an operator of system 80. Client 90 sends closed source client information 94 through a client server 82 and a secure channel 84 to a receiver 92. Secure channel 84 ensures that information 94 sent from client 90 is received by a receiver 92 without being tampered. Secure channel 84 may be implemented using many known techniques in the art. Client information 94 received by receiver 92 may be stored in a client database 88 and may be kept in a forensically sound manner. For example, client database 88 may be kept separate from all other databases.

Client information 94 may include, for example, information regarding where products were shipped by client 90, any returns or chargebacks received for the products, a list of customers of client 90, wholesaler and/or distributor data, a list of known incidents and/or complaints regarding client 90 and its products or services, and any other track or trace information.

Alternatively, other sources of closed source information 96 may be forwarded to receiver 92 and added to a closed source database 98 accessible to query server 72. For example, a law firm may put information produced pursuant to discovery requests into closed source database 98 or information from computers seized by authorities may be added to closed source database 98. Depending on the nature of the information, closed source database 98, may also be kept separate from client database 88 and platform database 68. Alternatively, client 90 may chose to purchase a dossier 70c and move that information in dossier 70c to the client's side of system 80 so that additional information from client 90 may be added to dossier 70c so as to comply with confidentiality issues such as legal privilege.

Query server 72, in conjunction with analyst 64, may now issue queries on platform database 68, client database 88, closed source database 98 and other database 89 to generate even richer dossiers 70 on entities. For example, a dossier 70a created by information from platform database 68 populated from open sources, may be supplemented with information from client 90 to produce an updated dossier 70a that includes both open and closed sources of information. Further, once dossier 70a is updated with information from client 90, other pieces of information from open sources in platform database 68 may now become more relevant and may be used to further supplement information in dossier 70a.

Figure 5:
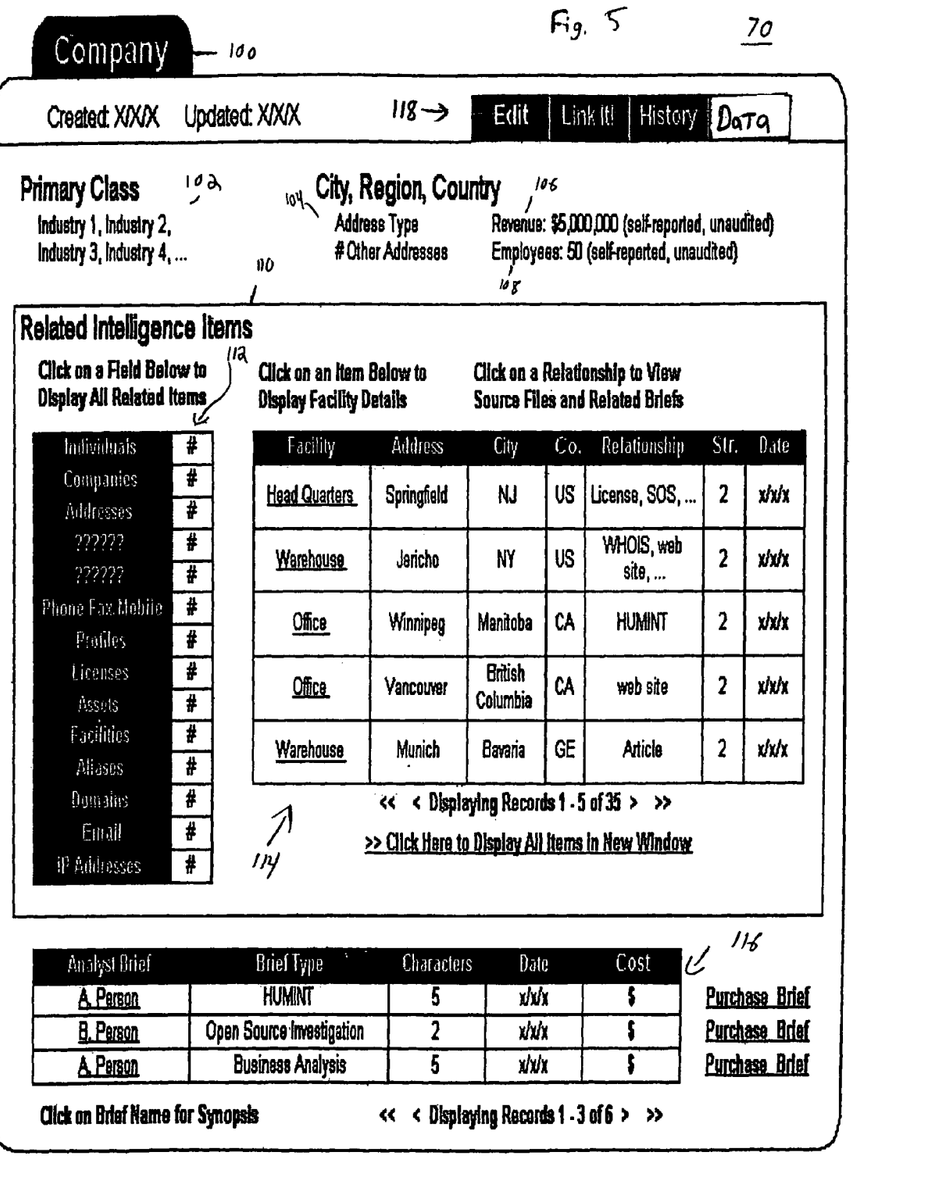
FIG. 5 is a diagram illustrating an example of a dossier which could be produced in accordance with an embodiment of the invention.

Dossiers 70 may each include a plurality of different types of information about a particular entity. An example of a dossier 70 is shown in FIG. 5. While some types of data are shown in FIG. 5, these types of data are meant to be illustrative only and not intended to be exhaustive. As shown in FIG. 5, a dossier 70 may be about a company 100. Primary class information 102 relating to industries that company 100 is active in may be listed. Addresses 104 about company 100 may be shown as well as revenue 106 and employees 108. A related intelligence item section 110 indicates available information about company 100. As shown, various intelligence fields 112 are available for company 100. Intelligence fields 112 include individuals, companies, addresses, phone/fax/mobile, profiles, licenses, assets, facilities, aliases, domains, email, IP addresses, etc. Each of the pieces of information in intelligence fields 112 has been determined by system 80 to be related to company 100 in some way. In the figure, the facilities intelligence field for company 100 is shown in a detailed intelligence area 114. Detailed intelligence area 114 shows various facilities determined to be related to company 100. A list of the related facilities is shown and a measure of how strong ("str") the relationship appears to be between the facility and company 100. This strength rating may be established by analyzing the number and types of links. The larger the number of links, the higher the strength rating. Links generated from structured intelligence data sources may result in a higher strength rating than those generated from unstructured data sources.

Any of the intelligence fields 112 may be accessed to learn more information about company 100. A listing 116 of the sources of the intelligence used to generate the dossier for company 100 is shown at the bottom of the figure along with a link enabling the purchase of complete briefs corresponding to the acquired intelligence. As is evident, the dossiers themselves may be linked together—such as a dossier on an individual and a company may be linked. Similarly, if an analyst decides that two or more dossiers relate to the same entity, the analyst may choose to merge dossiers.

Dossier 70 shown in FIG. 5 also includes tabs 118. Clicking on a "Data" tab allows a user to view a collection of the raw intelligence related to the dossier input by analysts and the parsing and linking server. The data may include, for example, items such as Usenet posts, emails, web pages, message board posts, IRC and instant messenger logs, etc. Clicking on a "History" tab allows a user to see a list of changes to items within the dossier. Clicking on an "Edit" tab allows an analyst to make manual additions and/or edits to the contents of the dossier.

Figure 6:
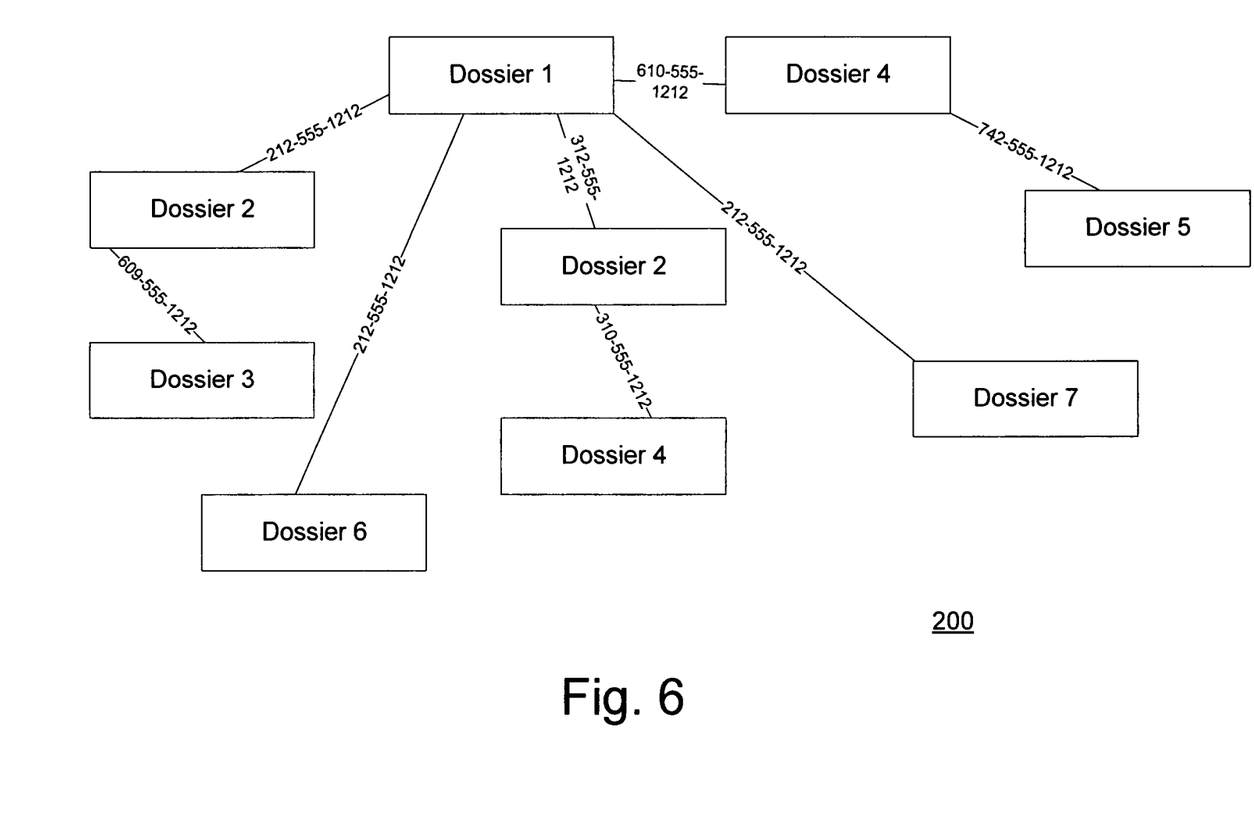
FIG. 6 is a diagram illustrating a map linking dossiers in accordance with an embodiment of the invention.
Figure 7:
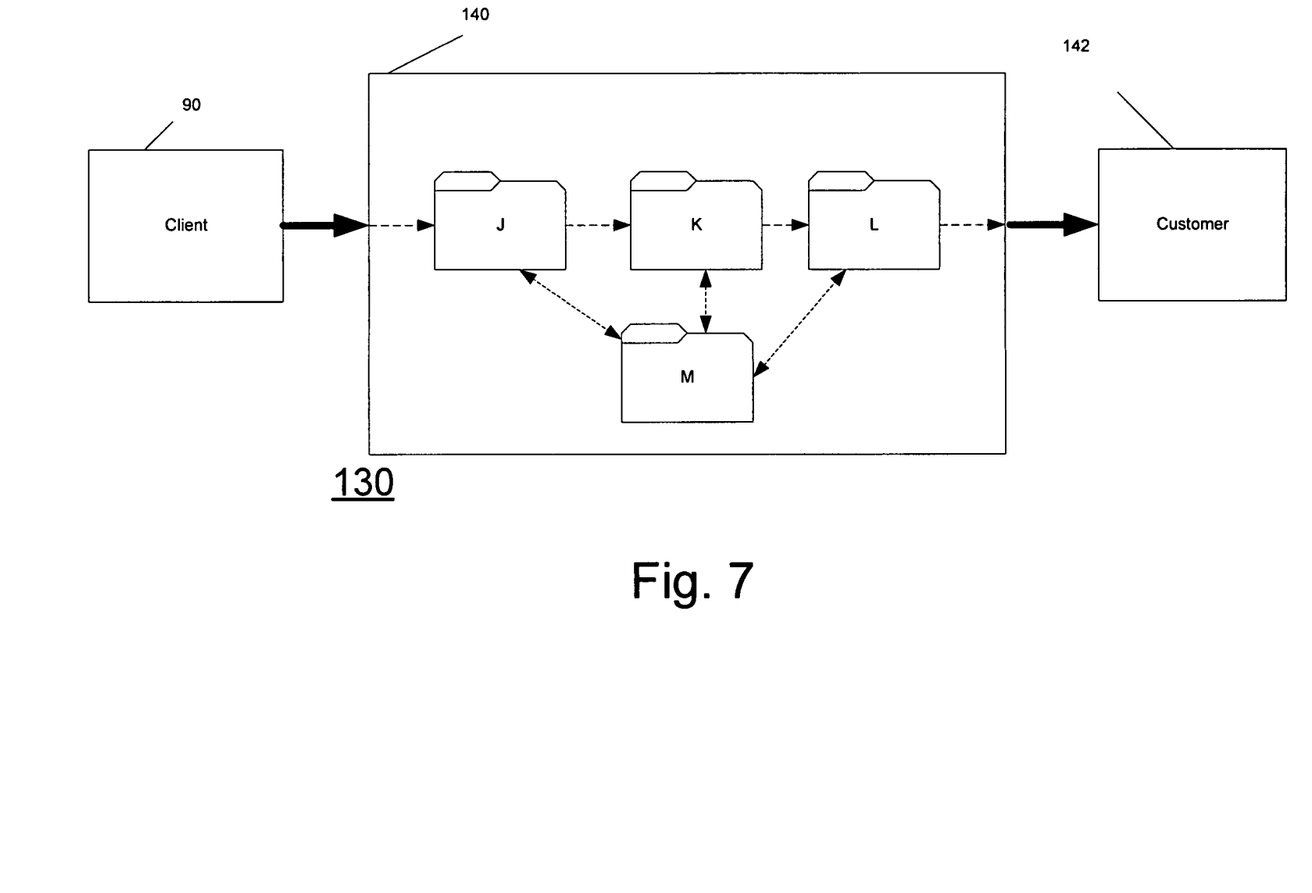
FIG. 7 is a representation of a display which could be produced in accordance with an embodiment of the invention.

Clicking on a "Link It!" tab allows a user to generate and view a map of the relationships between dossier 70 and other dossiers based on related structured information. Upon selection of the "Link It!" tab, a user is asked upon which original piece of information it would like to link against and how many relationship levels it would like to link out from this original piece of information. For example, referring to FIG. 6, there is shown an example of a Link It! graph 200 in accordance with an embodiment of the invention. Graph 200 was produced by a user clicking on tab "Link It!" while viewing Dossier 1, selecting "phone number" as the piece of information it wanted to link against, and selecting 2 (two) relationship levels. As shown in FIG. 6, Dossier 1 shares the phone number "212-555-1212" with Dossier 2, Dossier 6, and Dossier 7. Similarly, Dossier 1 shares the phone number 312-555-1212 also with Dossier 2 and shares the phone number 610-555-1212 with Dossier 4. As the user selected 2 relationship levels, phone numbers shared by Dossiers 2, 4, 6 and 7 with other Dossiers are also shown in the figure. As shown, the phone number 609-555-1212 is shared by Dossier 2 and Dossier 3. Dossiers 6 and 7 do not appear to share phone numbers with any other dossiers. Dossier 2 also shares phone number 310-555-1212 with Dossier 4. In this way, a user can easily see relationship between dossiers.

Other information about company 100 may also be included in dossier 70. For example, recent market intelligence about company 100 such as who company 100 ships to, sells to, what marketing language it uses, and countries where it receives its products from—may be stored. Product and service intelligence may be stored in dossier 70 such as products being offered for sale by company 100, and how system 80 knows about the offer (such as trade boards, internet stores, catalogues, fax blasts, auctions, forums, etc.). Threat intelligence about company 100 may be stored—such as whether company 100 has recently been a party in a legal proceeding—criminal or civil, OASIS information, FDA information, parallel trade licenses, etc.

Referring again to FIG. 4, client 90 may chose to issue queries 86 on dossiers 70. For example, client 90 may wish to see a dossier on a particular entity or wish to see any dossiers which include information relating to a particular query. Client 90 may, for example, ask for any information relating to drug XYZ. Any dossier 70 which includes such information may be selected in response to queries 86. Further, a dossier may be created for drug XYZ and may include information relevant to the drug such as known distributors, diverters, wholesalers, countries of import and export, market price, etc.

Client 90 may request that reports 71 be generated based on dossiers 70 as desired or may set up a continuous request to receive reports 71 relating to a particular query every time new information relating to the query is gathered. For example, every time information about drug XYZ is updated in one of the dossiers 70, client 90 may be notified. Or any time product ABC appears on a trade board, information in platform database 68 and the corresponding dossier 70 is updated and client 90 is notified. Client 90 may also choose to purchase a snapshot dossier 70 showing information about an entity up to a particular point in time. As shown in FIG. 4, client 90 may choose to purchase a snapshot dossier for dossier 70c. Client 90 may then choose to add its own information 94 to dossier 70c on the client side of system 80. In this way, client 90 may efficiently handle confidentiality issues and/or may add information anonymously.

Dossiers 70 may be generated by analyst 64 or may be requested to be generated by client 90. For example, client 90 may request that a dossier of drug XYZ be generated. Further, client 90 may set forth rules for when a particular dossier should be updated. For example, for a dossier on drug XYZ, client 90 may set up a rule that whenever individual K is found to be related to drug XYZ, the corresponding dossier on drug XYZ, or on individual K, should be updated.

Referring to FIG. 6, one example of a report which may be generated by a client 90 may be a display 130 of a distribution channel 140 used by client 90. If client 90 is a manufacturer of a product, such as drug XYZ, it may be desirable to analyze intelligence relating to entities who move the product from client 90 to a customer 142. If the product goes through entity J and then entity K and finally to entity L, client 90 may simply request a dossier for each one of those entities to see whether any one of those entities has any relation to nefarious activity. For example, display 130 may include a hyperlink to each respective dossier J, K, L and M so that client 90 viewing display 130 can simply link to the respective dossier. Furthermore, upon viewing the dossiers for entities J, K and L, client 90 may learn that an additional entity M has a relationship to entities J, K and L and perhaps M is also known as selling drug XYZ—a fact which may have been previously unknown to client 90. Client 90 may now use this information in dealing with entities J, K, L and M.

Client 90 may use dossiers 70 to validate the authenticity of sources and contacts. Trends and patterns in the marketplace may be determined that may be actionable to client 90—such as fraud, theft, conversion, trademark infringement, etc. Client 90 may simply be interested in dealing with a new entity and may use dossiers 70 to perform due diligence on this new entity.

Dossiers 70 may be used to discover relationships among entities. For example a query may be performed for all entities trading in drug XYZ. Such a query may yield 10 dossiers. Then, on those 10 dossiers, a query may be performed to see who appears to be a counterfeiter or diverter. This may be accomplished by examining market data sections of received information for commercial activity summaries. If, for example, a company is offering products below wholesale cost, the company is likely involved in illicit activity. Similarly, if the company is offering products in geographies distinct from where they list their addresses, there may be a presumption that the company is diverting and/or counterfeiting a product.

That search may yield 4 dossiers. The search may be narrowed by how frequently counterfeiting is performed. This may be determined by the value of offers collected by system 50. This last search may yield only two dossiers. These remaining two dossiers represent the most relevant entities counterfeiting drug XYZ and the most important targets to pursue. Prior art techniques could only list a number of individuals performing counterfeiting, but could not provide an indication of the most relevant entities performing the counterfeiting System 80 enables a user to determine the most relevant entities, yields an evolving view of these entities, and is more automated than systems of the prior art.

Thus, by incorporating systems and/or methods in accordance with the invention, more comprehensive and richer intelligence gathering and analysis is achieved.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method to generate a data file related to a particular entity, the method comprising:

performing a first search, by a processor, with use of a first search term related to the particular entity, wherein performance of the first search includes sending the first search term over a network;

receiving, by the processor, first results from the first search, wherein the first results relate to the particular entity and wherein the first results include first data in a first structure;

parsing, by the processor, the first data from the first structure to produce first pieces of unstructured data;

receiving, by the processor, second results from the first search, wherein the second results relate to the particular entity and wherein the second results include second data in a second structure, wherein the second structure is different from the first structure;

parsing, by the processor, the second data from the second structure to produce second pieces of unstructured data;

identifying matching pieces of data from among the first and second pieces of unstructured data;

combining the matching pieces of data to form combined data in a third structure different from the first structure and the second structure, wherein the third structure relates to the particular entity as opposed to other entities, and wherein the combined data in the third structure relates to the particular entity;

storing the combined data in the third structure in a memory;

receiving a second search query related to the entity;

performing the second search of the combined data in the third structure, by the processor, with use of the second search query related to the entity;

producing a data file by the processor based on the results of the second search, wherein the data file includes at least some of the first and second pieces of unstructured data; and storing the data file in the memory.

2. The method of claim 1, further comprising, by the processor, applying a rule to the first and second searches, wherein the first and second results are based on a condition of the rule.

3. The method of claim 2, further comprising, by the processor:

receiving a third search query related to the particular entity;

identifying the third structure from among other third structures as relating to the particular entity;

performing the third search with use of the third search query related to the particular entity, wherein performance of the third search includes sending the third search query over the network;

receiving, by the processor, third results from the third search, wherein the third results relate to the particular entity, the third results are received based on the condition of the rule, and the third results include third data in a fourth structure;

parsing, by the processor, the third data from the fourth structure to produce third pieces of unstructured data; and modifying, by the processor, the data file based on the third pieces of unstructured data.

4. The method of claim 1, wherein the particular entity includes a person, a business, a product, or a service.

5. The method of claim 1, wherein the third structure includes a database related to the particular entity.

6. The method of claim 1, wherein the first results and second results include phone numbers, names, addresses, uniform resources locators, and/or emails.

7. The method of claim 1, wherein the data file includes a link, and wherein the link is effective to allow access to at least a portion of the first data.

8. The method of claim 1, further comprising:
storing the first data in the memory, prior to parsing the first data; and
storing the second data in the memory, prior to parsing the second data.

9. The method of claim 1, wherein the data file includes a link, wherein the link is effective to allow access to at least a portion of the first data, and the method further comprises:
storing the first data in the memory, prior to parsing the first data;
storing the second data in the memory, prior to parsing the second data;
providing a first link in the data file, wherein the first link is effective to allow access to the stored first data; and
providing a second link in the data file, wherein the second link is effective to allow access to the stored second data.

10. The method of claim 1, wherein the first search further includes a search of information not available over the internet.

11. The method of claim 1, further comprising:
generating one or more ratings based on a number and a type of links between the first and second pieces of unstructured data and the entity, wherein the ratings indicate a strength of a relationship between at least some of the first and second pieces of unstructured data and the particular entity; and
including the one or more ratings in the data file.

12. The method of claim 1, wherein the data file is a first data file, and the method further comprises:
selecting an item of information from the matching pieces of data; and
linking the first data file to at least one second data file, when the second data file includes the selected item of information.

13. The method of claim 1, further comprising:
receiving a third search query related to the particular entity;
identifying the third structure from among other third structures as relating to the particular entity;
performing the third search, by the processor, with use of the third search query related to the particular entity, wherein performance of the third search includes sending the third search query over the network;
receiving, by the processor, third results from the third search, wherein the third results relate to the particular entity and wherein the third results include third data in a fourth structure, wherein the fourth structure is related to the particular entity;
parsing, by the processor, the third data from the fourth structure to produce third pieces of unstructured data;
modifying the data file, based on the third pieces of unstructured data; and
generating a report based on the modified data file, wherein the report includes information related to the third results.

14. A method to modify a data file, the method comprising:
receiving, by a processor, the data file, wherein the data file relates to an entity;
wherein the data file comprises:
first results from a first search related to the entity, wherein the first results include first data in a first structure;
wherein the first results have been parsed to produce first pieces of unstructured data in the data file;
second results from the first search related to the entity, wherein the second results include second data in a second structure, wherein the second structure is different from the first structure;
wherein the second results have been parsed to produce second pieces of unstructured data in the data file;
wherein the data file further includes matching pieces of data from among the first pieces of unstructured data and the second pieces of unstructured data in a third structure different from the first and second structure, wherein the third structure relates to the particular entity as opposed to other entities, and and wherein matching data in the third structure relates to the particular entity;
performing a second search of the data file with use of a second search term related to the particular entity;
modifying the data file by the processor based on the results of the second search; and
storing the modified data file in the memory.

15. The method of claim 14, wherein the data file is a first data file, and the method further comprises linking the data file to a second data file, different from the first data file, when the first and second data file include at least one common piece of unstructured information.

16. The method of claim 14, wherein the first search results and second search results are unavailable over the internet.

17. A computing device comprising:
a processor; and
a memory configured to be in communication with the processor, and effective to store instructions;
the processor effective to, in accordance with the instructions:
perform a first search with use of a first search term related to a particular entity, wherein performance of the first search includes transmission of the first search term over a network;
receive first results from the first search, wherein the first results relate to the particular entity and wherein the first results include first data in a first structure;
parse the first data from the first structure to produce first pieces of unstructured data;
receive second results from the first search, wherein the second results relate to the particular entity and wherein the second results include second data in a second structure, wherein the second structure is different from the first structure;
parse the second data from the second structure to produce second pieces of unstructured data;
identify matching pieces of data from among the first and second pieces of unstructured data;
combine the matching pieces of data to form combined data with a third structure different from the first structure and the second structure, wherein the third structure relates to the particular entity as opposed to other entities, and wherein the combined data in the third structure relates to the particular entity;
store the combined data in the third structure in a memory;
receive a second search query related to the entity;
perform the second search of the combined data in the third structure with use of the second search query related to the entity;
produce a data file based on the results of the second search, wherein the data file includes at least some of the first and second pieces of unstructured data; and
store the data file in the memory.

18. The computing device of claim 17, wherein the processor is further effective to:
- receive a third search query related to the particular entity;
- identify the third structure from among other third structures as relating to the particular entity;
- perform the third search with use of the third search query related to the particular entity, wherein performance of the third search includes transmission of the third search query over the network;
- receive third results from the third search, wherein the third results relate to the particular entity, and wherein the third results include third data in a fourth structure;
- parse the third data from the fourth structure to produce third pieces of unstructured data; and
- modify the data file based on the third pieces of unstructured data.

19. The computing device of claim 17, wherein the first results and second results include phone numbers, names, addresses, uniform resources locators, and/or emails.

20. The computing device of claim 17, wherein the data file includes a link, and wherein the link is effective to allow access to at least a portion of the first data.

\* \* \* \* \*